United States Patent [19]

Kniess

[11] Patent Number: 4,709,947
[45] Date of Patent: Dec. 1, 1987

[54] PLUMBING FITTING FOR A MULTIPLE-LINE CONNECTION

[76] Inventor: Donald L. Kniess, 124 Cedar Dr., West Milton, Ohio 45383

[21] Appl. No.: 798,651

[22] Filed: Nov. 15, 1985

[51] Int. Cl.[4] .............................................. F16L 41/00
[52] U.S. Cl. .................................... 285/150; 285/155
[58] Field of Search ................ 285/150, 155, 156, 132

[56] References Cited

U.S. PATENT DOCUMENTS

| | | | |
|---|---|---|---|
| 765,484 | 7/1904 | Hochstein | 285/155 X |
| 1,211,262 | 1/1917 | Welsh | 285/150 X |
| 2,479,578 | 8/1949 | Langvand | 285/210 |
| 2,622,929 | 12/1952 | Neufeld | 285/155 X |
| 2,759,360 | 8/1956 | Budnick | 285/150 X |
| 2,978,225 | 4/1961 | Dallas, Jr. | 285/150 X |
| 3,736,955 | 6/1973 | Schlesser | 137/561 |
| 3,760,842 | 9/1973 | Mikiya | 285/155 X |
| 3,934,605 | 1/1976 | Legris | 137/271 |
| 4,080,752 | 3/1978 | Burge | 285/156 X |

FOREIGN PATENT DOCUMENTS 1190993 10/1959 France ................................ 285/156

Primary Examiner—Richard J. Scanlan, Jr.
Attorney, Agent, or Firm—Biebel, French & Nauman

[57] ABSTRACT

A fitting for connecting a plurality of plumbing conduits includes an elongated, hollow body having first and second ends. The body is formed as a single piece, and defines a generally smooth outer surface having opposed side walls and an inner central passageway extending from the first end to the second end. The central passageway defines at the first end an inlet opening having a circular cross section, and is closed at the second end. The body further defines a plurality of branch passageways formed in a spaced relationship through the opposed side walls of the outer surface. Each of the branch passageways opens through a projection formed in the outer surface at an outlet opening having a circular cross section and opens into said central passageway. The branch passageways are arranged symmetrically along the central passageway, and each is inclined at an angle of 135° with respect to the inlet end of the central passageway.

4 Claims, 5 Drawing Figures

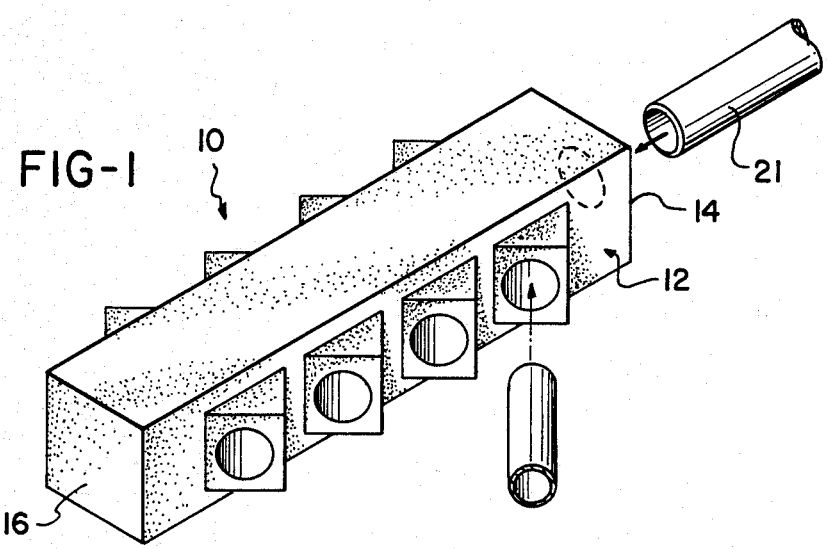
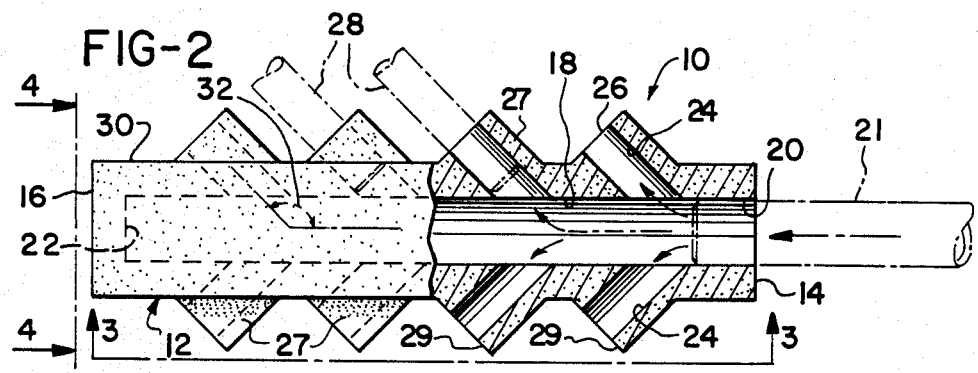
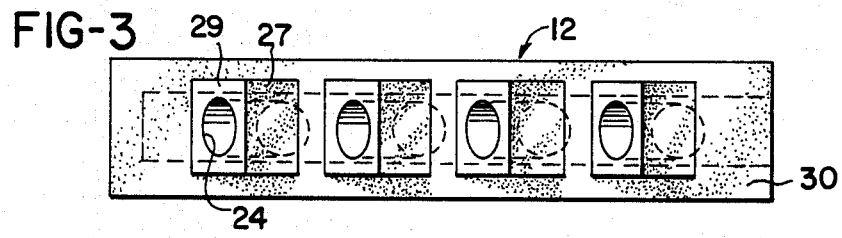
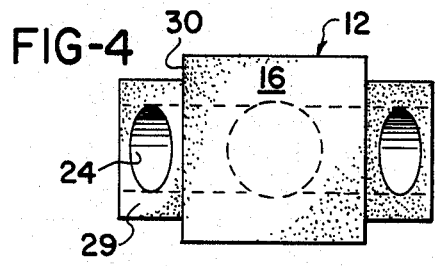
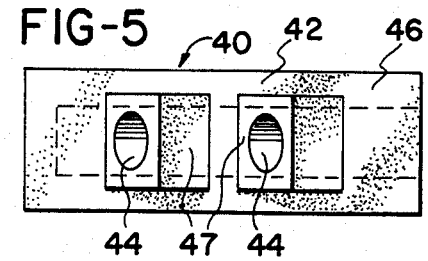

PLUMBING FITTING FOR A MULTIPLE-LINE CONNECTION

BACKGROUND OF THE INVENTION

The present invention relates generally to plumbing fittings and, more particularly, to those fittings which are specially adapted to connect multiple water lines.

Most urban and suburban residential structures are provided with a single incoming water line which branches from the general municipal water distribution system. As a structure is being built, a trench is typically dug, leading from the water main to the structure foundation. Along this trench, the incoming water line is positioned up to the point where it enters the structure. Once the line is in place, the trench is filled.

In a multi-family structure, such as an apartment unit, it is also typical to provide a single branch from the municipal system to the vicinity of the building. Just prior to entering the structure, however, the line is branched into individual lines leading to each unit. As a result, each individual family unit is provided with its own incoming line.

It is typical in such installations to use conventional tee-fittings to provide the necessary branches to the individual units of the multi-family structure. However, in the common situation of four or eight units to such a structure, it is necessary to use three or seven such fittings, respectively. This is not only inconvenient in that soldered connections of the individual tees must be made, but also is relatively expensive in view of the number of fittings which must be used. Further, because of the right angle arrangement of the branch lines formed by these fittings, it is quite awkward to arrange the various lines within the trench provided. Alternately, the trench must be expanded in the vicinity of the fittings, thereby creating additional work.

What is needed, therefore, is a plumbing fitting that overcomes the disadvantages of using a plurality of tee-fittings in making connections to an incoming water line for a multi-unit structure. Such a fitting should be simple in design and economical to produce, as well as providing for easy connection to the branch water lines leaving the fitting.

SUMMARY OF THE INVENTION

The present invention provides a fitting for connecting a plurality of plumbing lines, and includes an elongated, hollow body having first and second ends. The body is formed as a single piece, and defines a generally smooth outer surface having at least one side wall and an inner central passageway extending from the first end to the second end of the body. The central passageway defines at the first end an inlet opening having a circular cross-section, and is closed at the second end.

The body further defines a plurality of branch passageways formed in a spaced relationship through the outer surface of the body. Each of the branch passageways opens through the outer surface at an outlet opening having a circular cross section and further opens into the central passageway.

The outer surface of the body may be square in cross-section, so that the body defines first and second opposed side walls along its outer surface. An even number of the branch passageways are defined symmetrically through the first and second side walls. Further, each of the branch passageways formed through the first wall are mutually parallel, while each of the branch passageways formed through the second wall are similarly mutually parallel.

In addition, each of the branch passageways defines an angle in cooperation with the portion of the central passageway that extends from the branch passageway to the inlet opening that is greater than 90°, and preferably 135°.

The body may further define a plurality of projections extending outwardly from the first and second side walls. One of the branch passageways then opens through each of the projections. The projections each define a leading surface, with the branch passageway opening through the leading surface. The leading surface is oriented at an angle of 135° with respect to the first and second walls, and perpendicular to the branch passageways. Each of the leading surfaces may also define substantially a square.

Accordingly, it is an object of the present invention to provide a fitting for connecting a plurality of plumbing lines that is particularly adapted for use with individual water inlet lines to a multi-unit structure. It is a further object to provide such a fitting that is a single and yet simple member, so that no interconnection of individual fittings is required. Still further, it is an object of the present invention to provide such a fitting that may be easily and economically produced.

Further objects and advantages of the invention will be apparent from the following description, the accompanying drawings, and the appended claims.

BRIEF DESCRIPTION OF THE DRAWINGS

FIG. 1 is a three-quarter view of a fitting in accordance with the present invention;

FIG. 2 is a plan view of the fitting of FIG. 1, with the fitting partially cut away to illustrate the internal passageways thereof;

FIG. 3 is a side view of the fitting, taken generally along line 3—3 of FIG. 2;

FIG. 4 is an end view of the fitting taken generally along the line 4—4 of FIG. 2; and FIG. 5 is a side view similar to FIG. 3, showing an alternative embodiment for the fitting of the present invention.

DETAILED DESCRIPTION OF THE PREFERRED EMBODIMENTS

Referring now to the drawings, the plumbing fitting in accordance with the present invention is shown generally in FIG. 1. The fitting 10 includes an elongated hollow body 12 having first and second ends 14 and 16. The body is formed as a single piece, and is preferably cast in brass, as is typical with plumbing fittings intended for use in connection with copper pipe. As an alternative, the fitting may be molded from an appropriate plastic material, such as polyvinyl chloride, for use in connection with pipe made from a plastic material. Of course, it will be recognized that any castable or moldable material suitable for use with water piping would be appropriate for body 12.

A partial sectional view taken through the center of body 12 can be seen by reference to FIG. 2. There, it can be seen that a central passageway 18 is formed along the length of body 12, extending from first end 14 to second end 16. Passageway 18 is open at end 14 to define an inlet opening 20, and is closed at end 16 to form a closed end 22. Passageway 18, or at least that portion at and adjacent to open end 20, is formed to be of the same diameter as a water inlet conduit 21 with which the fitting 10 is to be used. A typical diameter for open end 20 is 1.0″ (2.5 cm).

The inner surface of passageway 18 in the vicinity of inlet end 20 may be smooth as shown in FIG. 2, or alternatively, may be threaded in the event that a threaded connection with inlet water conduit 21 is desired. It is anticipated that connection of fitting 10 with the inlet conduit will be made by soldering, or by other appropriate means known to those skilled in the art.

A plurality of branch passageways 24 are formed within body 12, each branch passageway 24 connecting with the central passageway 18 and opening through the outer surfaces of body 12. Each passageway 24 is formed having a circular cross section, with a diameter equal to the outside diameter of the branch water lines which are intended to lead away from fitting 10. For example, passageways 24 may have a diameter of 0.0875 inches (2.2 cm).

Each branch passageway 24 opens at an outlet opening 26. Referring to FIG. 4, it can be seen that in the preferred embodiment, body 12 is formed having a square cross-section. Consequently, body 12 defines a pair of opposing side surfaces 30. Each branch conduit 24 is then formed to extend through one of these side surfaces 30.

Surrounding each opening 26 is a projection 27 extending outwardly from the side wall 30 of body 12. The projections 27 are preferably formed to have a triangular configuration when viewed from above, as in FIG. 2, and to have a square configuration for each of the two side faces of each projection. A branch passageway 24 opens through one of the side faces of each projection 27, the side face being indicated as leading surface 29. Each outlet opening 26 is thus formed through a leading surface 29.

A branch conduit 28 may be connected into each opening 26. As with the inlet conduit at inlet opening 20, outlet openings 26 and the interior of passageways 24 may be made smooth to facilitate a soldering connection for conduits 28. Alternatively, threads may be provided on the surface of each passageway 24 for a threaded connection with conduits 28.

Further, as seen by reference to FIG. 2, branch passageways 24 are defined so as to be mutually parallel and spaced equi-distantly along each side surface 30 of body 12. Thus, the outlet conduits 28 emerging from the fitting 10 are arranged in an orderly fashion for ease in routing these conduits to the individual units of the structure which the water line is intended to serve.

Of course, it should be recognized that fitting 10 need not be square in cross-section as shown in FIG. 4, but could, for example, have a circular cross-section. However, the square cross-section shown in the drawings represents an effective compromise between ease of use of the fitting, orderly distribution of branch water conduits, ease in producing a mold to form the fitting 10, and the provision of sufficient material of body 12 along each branch passageway 24 with which to connect the conduits 28 to the fitting 10.

To provide sufficient strength to the cast fitting, it will also be noted from FIG. 4 that the body 12 is relatively thick with respect to side surfaces 30 and central passageway 18. In the preferred embodiment, it can be seen that the minimum thickness of fitting 12 is approximately one-half the diameter of the central passageway 18. Of course, variations in this dimension are possible, so long as care is taken not to excessively weaken the fitting.

If the fitting is made with side walls sufficiently thick that sufficient soldering area is available along only the portions of the branch passageways 24 within the fitting body 12, branch conduits 28 could be secured to the fitting without relying upon projections 27. In such a case, the fitting could be formed with smooth side walls 30.

It should be further noted that branch passageways 24 do not extend from central passageway 18 in perpendicular fashion. Rather, the angle defined by each branch passageway 24 with respect to the portion of central passageway 18 extending from inlet end 20 to the junction with the branch passageway is greater than 90°, as shown by angle 32 in FIG. 2. This angle is provided so that the branch conduits 28 are directed generally toward their desired entry into the structure. Thus, the size of the trench which must be provided to contain the various water conduits can be kept to a relative minimum. This is in contrast to the tee-fitting used in the prior art, which require that branch conduits leave the fitting perpendicular to the incoming line.

In the preferred embodiment, angle 32 is 135°. Leading surface 29 of each projection 27, through which the branch conduit 28 opens, is formed to be perpendicular to the branch conduit. Thus, in the preferred embodiment, the leading surfaces 29 are also located at angles of 135° with respect to side walls 30.

The preferred embodiment shown in FIGS. 1-4 of the drawings provides a total of eight branch passageways 24. Thus, it is intended that the fitting shown therein would be used in connection with an eight-unit building structure. Of course, it should be recognized that similar fittings having lesser or greater numbers of branch passageways can be constructed, as illustrated by the embodiment of the fitting shown in FIG. 5. There, the fitting 40 includes a body 42 that has formed therein four branch passageways 44, two provided in each side surface 46, opening through projections 47. Such a fitting, of course, would be used with a four-unit building structure. Fittings have other numbers of branch passageways could be constructed, and it will also be recognized that a fitting having a greater number of branch passageways than required could be used. In such a case, the unneeded passageways could have capped lengths of pipe or plugs fitted thereinto.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A fitting for connecting a plurality of plumbing conduits, comprising:
   an elongated, hollow body having first and second ends, said body being formed as a single piece;
   said body defining a generally smooth outer surface, said body being square in cross section, said body thereby defining first and second opposed side walls along said outer surface, and having an inner central passageway extending from said first end to said second end;
   said central passageway defining at said first end an inlet opening having a circular cross section, said central passageway further being closed at said second end;

said body further defining a plurality of branch passageways formed in a spaced relationship through said outer surface, each of said branch passageways opening through said outer surfaces at an outlet opening having a circular cross section, and opening into said central passageway;

a number of first ones of said branch passageways being defined through said first side wall and an equal number of second ones of said branch passageways being defined through said second side wall, said first and second branch passageways further being arranged symmetrically along said central passageway;

each of said first branch passageways being formed in parallel, each of said second branch passageways being formed in parallel; and each of said first and second branch passageways defining an angle in cooperation with a portion of said central passageway extending from said branch passageway to said inlet opening of 135°.

2. A fitting as defined in claim 1, wherein:

said body further defines a plurality of projections extending outwardly from said first and second side walls, one of said branch passageways being defined through each of said projections; and each of said projections defines a leading surface, one of said branch passageways opening through said leading surface, each of said leading surfaces being oriented at an angle of 135° with respect to said first and second walls and perpendicular to said branch passageways.

3. A fitting as defined in claim 2, wherein each of said leading surfaces defines substantially a square.

4. In a plumbing system including a plurality of water-carrying conduits and a fitting for connecting said conduits, said fitting comprising:

an elongated, hollow body having first and second ends, said body being formed as a single piece;

said body defining a generally smooth outer surface, said body being square in cross section, said body thereby defining first and second opposed side walls along said outer surface, and having an inner central passageway extending from said first end to said second end;

said central passageway defining at said first end an inlet opening having a circular cross section, said central passageway further being closed at said second end;

said inlet opening being adapted for connection with one of said conduits;

said body further defining a plurality of branch passageways formed in a spaced relationship through said outer surface, each of said branch passageways opening through said outer surface at an outlet opening having a circular cross section, and opening into said central passageway;

each of said outlet openings being adapted for connection with others of said conduits;

a number of first ones of said branch passageways being defined through said first side wall and an equal number of second ones of said branch passageways being defined through said second side wall, said first and second branch passageways further being arranged symmetrically along said central passageway;

each of said first branch passageways being formed in parallel, each of said second branch passageways being formed in parallel; and each of said first and second branch passageways defining an angle in cooperation with a portion of said central passageaway extending from said branch passageway to said inlet opening of 135°.

* * * * *